United States Patent
Kim et al.

(10) Patent No.: US 9,012,076 B2
(45) Date of Patent: Apr. 21, 2015

(54) ORGANIC RADICAL POLYIMIDE ELECTRODE ACTIVE MATERIAL, AND ELECTROCHEMICAL DEVICE COMPRISING SAME

(75) Inventors: Young Kyoo Kim, Daegu (KR); Hye Na Lee, Daegu (KR); Hwa Jeong Kim, Daegu (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 16 days.

(21) Appl. No.: 13/818,955
(22) PCT Filed: Apr. 13, 2012
(86) PCT No.: PCT/KR2012/002827
§ 371 (c)(1),
(2), (4) Date: Apr. 1, 2013
(87) PCT Pub. No.: WO2012/141532
PCT Pub. Date: Oct. 18, 2012

(65) Prior Publication Data
US 2014/0030593 A1   Jan. 30, 2014

(30) Foreign Application Priority Data
Apr. 14, 2011   (KR) .................. 10-2011-0034830

(51) Int. Cl.
*H01M 4/13* (2010.01)
*H01M 4/60* (2006.01)
*H01M 4/88* (2006.01)
*C08G 73/10* (2006.01)
*H01M 4/137* (2010.01)
*H01M 10/052* (2010.01)

(52) U.S. Cl.
CPC ............... *H01M 4/608* (2013.01); *C08G 73/10* (2013.01); *C08G 73/1039* (2013.01); *H01M 4/137* (2013.01); *H01M 10/052* (2013.01); *Y02E 60/122* (2013.01)

(58) Field of Classification Search
None
See application file for complete search history.

(56) References Cited

U.S. PATENT DOCUMENTS
2005/0250015 A1   11/2005   Wensley et al.

FOREIGN PATENT DOCUMENTS
JP   62-184025 A   8/1987
JP   2008-297362 A   12/2008
KR   10-2011-0021680 A   3/2011

OTHER PUBLICATIONS
International Search Report of the Korean Searching Authority issued in connection with PCT/US2012/002827 dated Nov. 28, 2012.

*Primary Examiner* — Cynthia K. Walls
(74) *Attorney, Agent, or Firm* — Levenfeld Pearlstein, LLC

(57) ABSTRACT

Disclosed herein is an organic radical polyimide, represented by Formula 1 below:

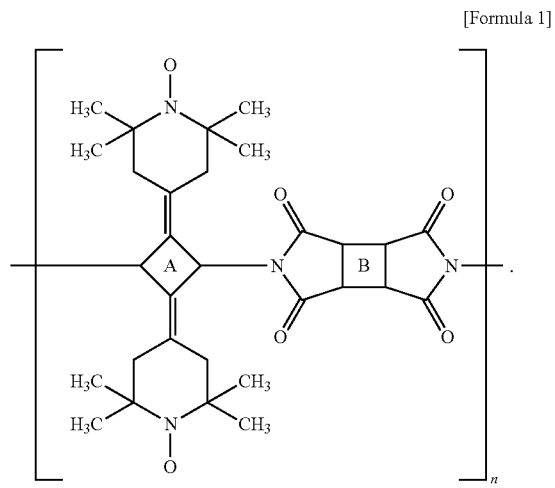

The organic radical polyimide can be applied to a cathode, an anode or the like, and can be widely applied to an organic solar cell, an organic transistor, organic memory or the like. Further, the organic radical polyimide can be used to manufacture a secondary battery having high energy density because it has high radical density. Further, the organic radical polyimide can be formed into an ultrathin film such as a polymer film and can be used to manufacture a flexible next-generation battery because it does not include metal components and causes a stable oxidation-reduction reaction.

15 Claims, 7 Drawing Sheets

(a)

(b)

(c)

ORGANIC RADICAL POLYIMIDE ELECTRODE ACTIVE MATERIAL, AND ELECTROCHEMICAL DEVICE COMPRISING SAME

CROSS-REFERENCE TO RELATED APPLICATIONS

This is a National Stage Application of International Patent Application No. PCT/KR2012/002827, filed Apr. 13, 2012, which claims the benefit of and priority to Korean Patent Application No. 10-2011-0034830, filed Apr. 14, 2011, the contents of which are incorporated fully by reference herein.

TECHNICAL FIELD

The present invention relates to an organic radical polyimide electrode active material and, more particularly, to an organic radical polyimide electrode active material which can be used to realise an electrochemical device having high energy density because of its high radical density, which can be formed into an ultrathin film such as a polymer film, and which can be utilized for a flexible electrochemical device, and to an electrochemical device including the same.

BACKGROUND ART

In secondary batteries, an inorganic material, such as carbon, lithium-cobalt oxide ($LiCoO_2$) or the like, is used as an electrode material. Therefore, no matter how such an inorganic electrode material is made thin, it may be easily cracked and thus destroyed when it is bent, so there is a problem in that it is difficult to apply it to next-generation batteries such as flexible ultrathin batteries and the like.

In order to overcome the above problem, NEC Corporation has developed polymers containing an organic radical. However, most of such polymers have low heat resistance, so there is a problem in that it is difficult to assure the lifespan of secondary batteries.

Recently, a method of stabilizing an organic radical polymer having a polynorbornene structure by curing polymer chains among themselves has been reported. However, this method is problematic in that it is difficult to increase the degree of curing because reactions occur only when polymer chains are in very close proximity to one another, and, particularly, in that, when a conventional inorganic electrode material, such as carbon or the like, is mixed with this organic radical polymer in order to increase an electrode capacitance, there is an increased tendency for polymer chains to keep away from each other.

Therefore, it is keenly required to develop an organic radical polymer electrode active material which can overcome the problem of low density and low conductivity, which does not cause a problem even when it is mixed with other inorganic electrode materials and which can be formed into a thermostable and flexible thin film.

DISCLOSURE

Technical Problem

Accordingly, the present invention has been devised, to solve the above-mentioned problems, and a first object, of the present invention is to provide an organic radical polyimide which is a novel electrode active material, which has high radical density and induces a stable oxidation-reduction reaction, and which can be formed into a flexible polymer film.

A second object of the present invention is to provide a flexible electrochemical device which vases an electrode including the novel organic radical polyimide and which can be made ultrathin.

A third second object of the present invention is to provide an electrochemical device which is a lithium secondary battery.

Technical Solution

In order to accomplish the first object, an aspect of the present invention provides an organic radical polyimide which is a novel electrode active material represented by Formula 1 below:

[Formula 1]

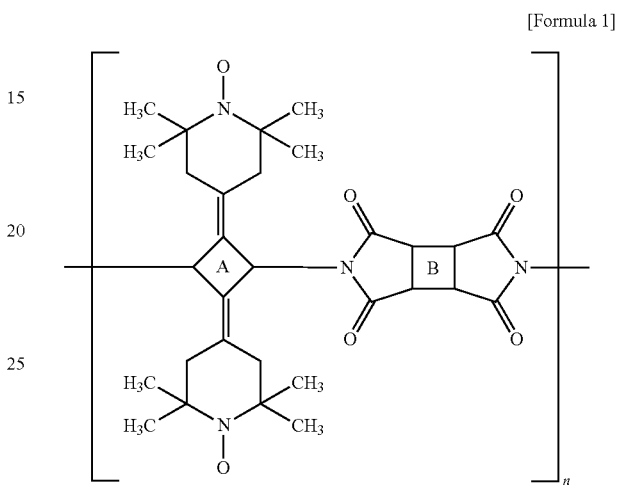

wherein A is a substituted or unsubstituted aryl group of 6 to 24 carbon atoms; and B is selected from the group consisting of a substituted or unsubstituted aryl group of 6 to 24 carbon atoms, a substituted or unsubstituted alkyl group of 1 to 6 carbon atoms and a substituted or unsubstituted alkoxy group of 1 to 6 carbon atoms, and is condensed with an adjacent pyrrolidine ring to form a ring.

In Formula 1 above, A and B may be each independently further substituted with one or more selected from the group consisting of a hydrogen atom, a heavy hydrogen atom, a cyano group, a halogen atom, a hydroxy group, a nitro group, a substituted or unsubstituted alkyl group of 1 to 6 carbon sterns and a substituted or unsubstituted aryl group of 6 to 24 carbon atoms.

In order to accomplish the second object, another aspect of the present invention provides an electrode including the organic radical polyimide represented by Formula 1 above. Here, the electrode may be a cathode.

Still another aspect of the present invention provides an electrochemical device, including: a cathode; an anode; and an electrolyte, wherein the cathode or anode is an electrode including the organic radical polyimide represented by Formula 1 above.

Here, the electrochemical device may be a lithium secondary battery.

Advantageous Effects

As described above, the organic radical polyimide according to the present invention can be applied to a cathode, an anode or the like, and can be widely applied to an organic solar cell, an organic transistor, organic memory or the like. Further, the organic radical polyimide can be used to manufacture a secondary battery having high energy density because it has high radical density. Further, the organic radical polyimide can be formed into an ultrathin film such as a polymer film and can be used to manufacture a flexible next-generation battery because it does not include metal components and causes a stable oxidation-reduction reaction.

BEST MODE

Figure 1:
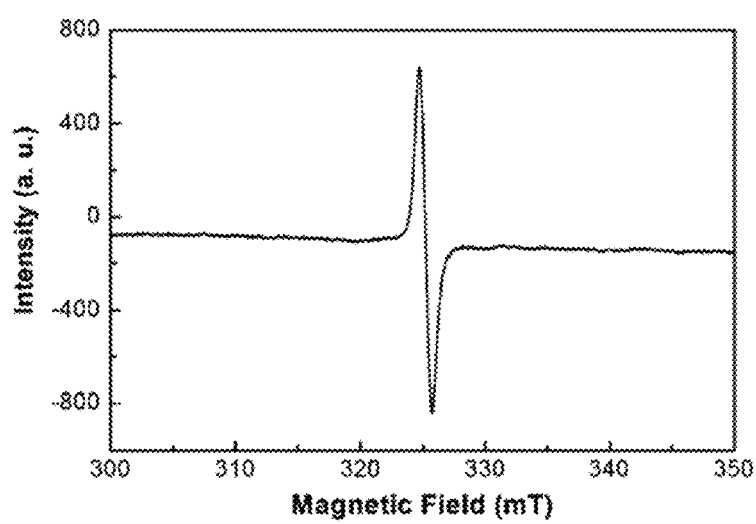
FIG. 1 is a graph showing the ESR spectrum of PMDA-TDAQ PI according to an embodiment of the present invention.

Hereinafter, preferred embodiments of the present invention will be described in detail.

The present invention provides an organic radical polyimide which is a novel electrode active material represented by formula 1 below:

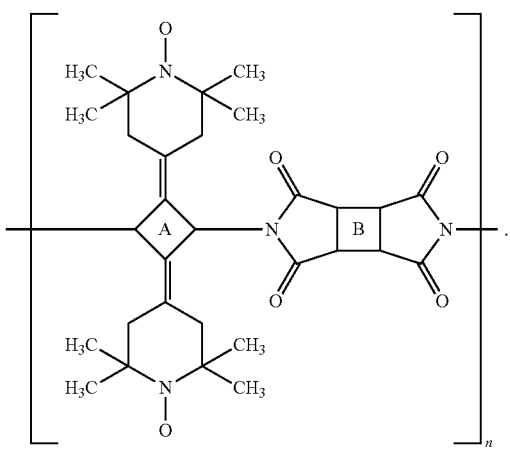

[Formula 1]

The present invention relates to the synthesis of a polyimide containing an organic radical, and, particularly, is characterized in that a diamine component constituting a polyimide is bonded with two or more organic radicals.

Further, in the course of finally synthesizing an organic radical polyimide, an organic radical polyamic acid represented by Formula 2 below is synthesized:

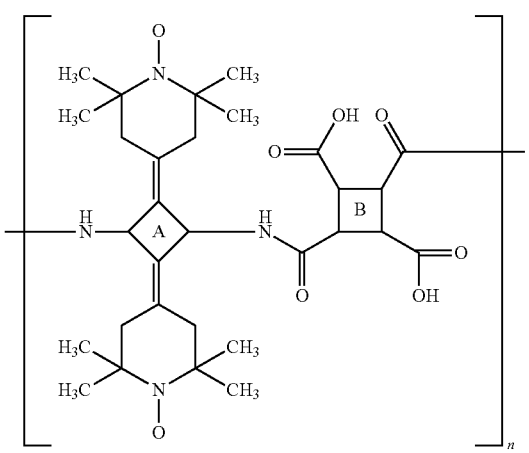

[Formula 2]

wherein A is a substituted or unsubstituted aryl group of 6 to 24 carbon atoms; and B is selected from the group consisting of a substituted or unsubstituted aryl group of 6 to 24 carbon atoms, a substituted or unsubstituted alkyl group of 1 to 6 carbon atoms and a substituted or unsubstituted alkoxy group of 1 to 6 carbon atoms, and is condensed with an adjacent pyrrolidine ring to form a ring.

The organic radical polyamic acid can be coated by wet coating because its solubility in an organic solvent is high, and it is finally converted into an organic radical polyimide by heat treatment or the like. The finally-prepared organic radical polyimide can be dissolved in a solvent depending on the kind of dianhydride of the components constituting the polyimide.

Therefore, the present invention is characterized in that there is no problem even when the organic radical polyimide is mixed with a conventional inorganic electrode material, such as carbon or the like, because the heat resistance thereof is influenced by a polymer intra-chain reaction, not a polymer inter-chain reaction.

In particular, in the organic radical polyimide of the present invention, a high-strength polyimide, which is not dissolved in a solvent at all, is advantageous in that it can be formed into a thin film electrode by dissolving a soluble polymer precursor in various solvents because it is prepared by thermally-imidizing organic radical polyamic acid which is a soluble precursor. Further, the high-strength polyimide is characterized in that processability is very high because it can be synthesized such that the organic radical polyimide itself becomes soluble by inserting a soluble group into a polyimide structure.

Further, in the case where insoluble polyimide is directly synthesized without performing a precursor process, when this insoluble organic radical polyimide powder is mixed with soluble polyimide (or a precursor thereof), heat resistance can be improved, and functions can be varied.

Specific examples of an alkyl group, which is a substituent group used in the present invention, may include methyl, ethyl, propyl, iso-butyl, sec-butyl, tert-butyl, pentyl, iso-amyl, hexyl, and the like. At least one hydrogen atom of the alkyl group may be substituted with a hydroxy group, a nitro group, a cyano group, a silyl group (in this case, referred to as "an alkylsilyl group"), a substituted or unsubstituted amino group (—NH$_2$, —NH(R), —N(R')(R"), R' and R" are each independently an alkyl group of 1 to 10 carbon atoms, and, in this case, referred to as "an alkylamino group"), a hydrazine group, a hydrazone group, a carboxylic group, a sulfonic group, a phosphoric group, an alkyl group, a halogenated alkyl group, an alkenyl group or an aryl group.

Specific examples of an alkoxy group, which is a substituent group used in the present invention, may include methoxy, ethoxy, propoxy, iso-butyloxy, sec-butyloxy, pentyloxy, iso-amyloxy, hexyloxy, and the like. At least one hydrogen atom of the alkoxy group, the same as the alkyl group, may be substituted with a substituent group.

The aryl group used in the present invention is an aromatic system including one or more rings, and the rings may be bonded or fused with each other by a pendant method. Further, the aryl group includes a noncondensible aromatic group. Specific examples of the aryl group may include aromatic groups, such as phenyl, naphthyl, anthracenyl, phenanthryl, pyrenyl, chrysenyl, fluoranthenyl and the like, and specific examples of the noncondensible aromatic group may include biphenyl, terphenyl and the like. At least one hydrogen atom of the aryl group, the same as the alkyl group, may be substituted with a substituent group (for example, an aryl group substituted with an amino group is referred to as "an arylamino group, and an aryl group substituted with an oxy group is referred to as "an aryloxy group").

In the present invention, the term "unsubstituted or substituted" means that any group is unsubstituted or substituted with one or more selected from the group consisting of a hydrogen atom, a heavy hydrogen atom, a cyano group, a halogen atom, a hydroxy group, a nitro group, a substituted or unsubstituted alkyl group of 1 to 6 carbon atoms and a substituted or unsubstituted aryl group of 6 to 24 carbon atoms.

According to an embodiment of the present invention, the compound represented by Formula 1 above may be any one selected from the group consisting of compounds represented by Formulae 3 to 9:

[Formula 3]

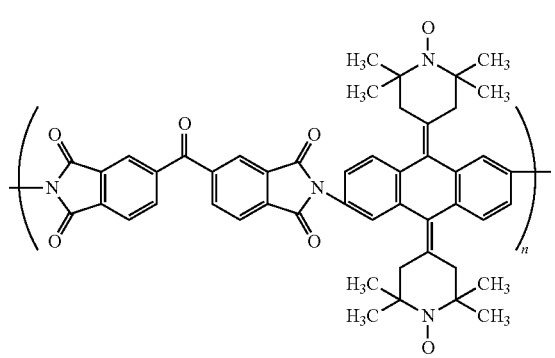

[Formula 4]

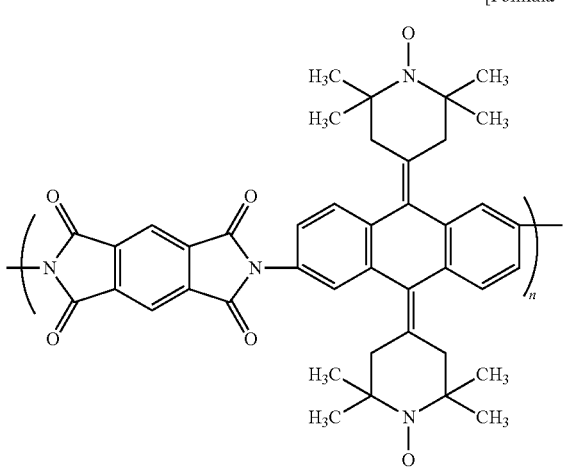

[Formula 5]

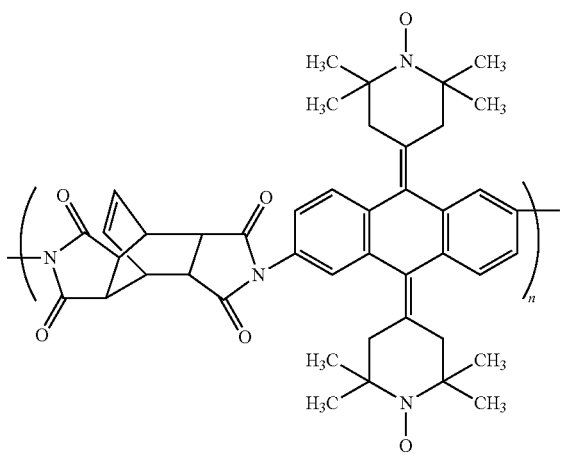

[Formula 6]

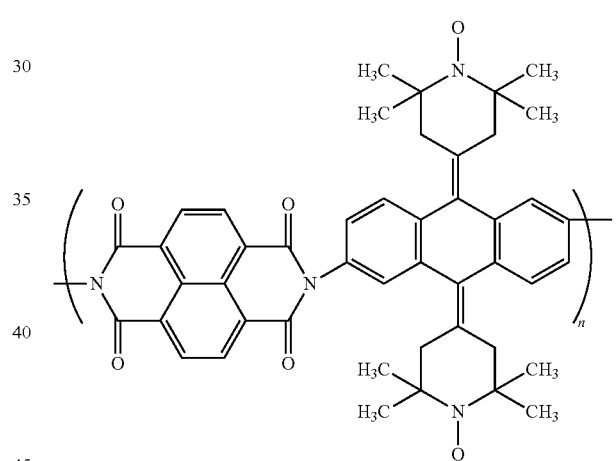

[Formula 7]

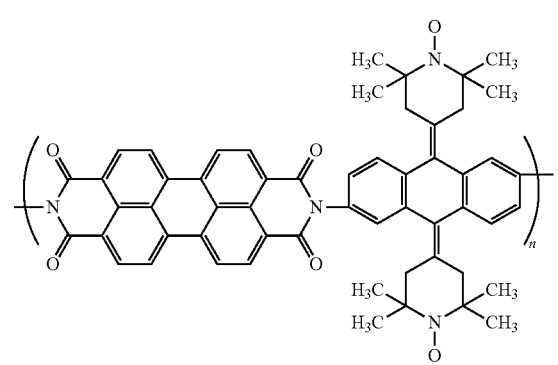

-continued

[Formula 8]

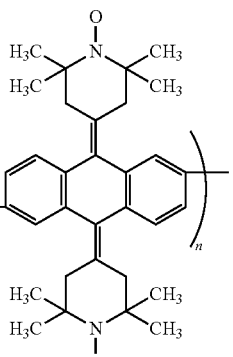

[Formula 9]

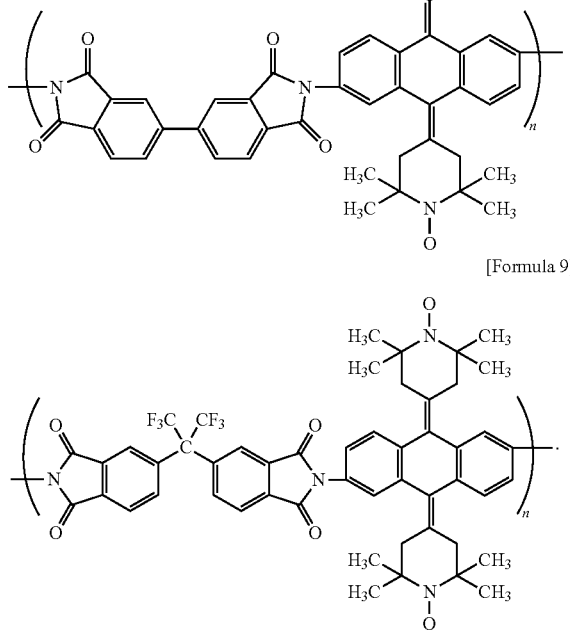

The present invention relates to a lithium secondary battery including the organic radical polyimide cathode active material as a constituent. Generally, a lithium secondary battery includes a cathode, an anode, a separation membrane and a lithium salt-containing nonaqueous electrolyte.

Figure 10:
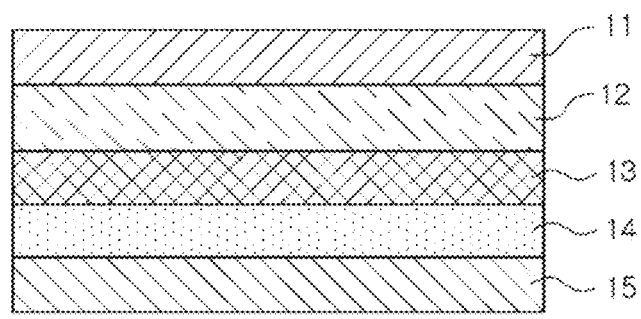
FIG. 10 is a schematic section view showing the structure of a lithium secondary battery according to the present invention.

FIG. 10 shows an exemplary structure of a lithium secondary battery according to the present invention.

Referring to FIG. 10, in a lithium secondary battery, an anode 11 and a cathode 13 are covered with a battery case in a state in which a separation membrane is disposed therebetween. The cathode 11 is provided at the upper end thereof with cathode terminals for electrically connecting components constituting the battery with external appliances, and the anode 13 is also provided at the upper end thereof with anode terminals for electrically connecting components constituting the battery with external appliances.

Hereinafter, a cathode, an anode, a separation membrane, an electrolyte and the like, which are constituents of a secondary battery, will be described in more detail.

The cathode 13 includes the organic radical polyimide of the present invention. For example, the cathode 13 is prepared by applying a mixture of the organic radical polyimide of the present invention, a conducting agent and a binder onto a cathode collector 14 and then drying the mixture. If necessary, a filler may be added to the mixture.

Generally the cathode collector is made to a thickness of 3 to 500 μm. Such a cathode collector is not limited as long as it has high conductivity while not causing a chemical change in the battery. For example the cathode collector may be made of stainless steel, aluminum, nickel, titanium, calcined carbon or may be made of aluminum or stainless steel surface-treated with carbon, nickel, titanium, silver or the like. The surface of the cathode collector may be made uneven to increase the adhesivity of the cathode collector to a cathode active material. The cathode collector may be fabricated in various forms, such as film, sheet, foil, net, porous body, foam, nonwoven fabric and the like.

The conducting agent is added in an amount of 1 to 50 wt % based on the total amount of the mixture including a cathode active material. Such a conducting agent is not limited as long as it has high conductivity while not causing a chemical change in the battery. Examples of the conducting agent may include: graphite such as natural graphite, synthetic graphite or the like; carbon black such as carbon black, acetylene black, Ketjen black, channel black, furnace black, lamp black, thermal black or the like; conductive fiber such as carbon fiber, metal fiber or the like; metal powder such as carbon fluoride powder, aluminum powder, nickel powder or the like; conductive whiskey such as zinc oxide, potassium titanate or the like; conductive oxides such as titanium oxide and the like; and conductive materials such as polyphenylene derivatives and the like. According to circumstances, the addition of the conducting agent may be omitted when a cathode active material is coated with another conductive layer.

The binder is a component for assisting the bonding between an active material and a conducting agent and the bonding between an active material and a collector. Generally, the binder is added in an amount of 1 to 50 wt % based on the total amount of the mixture including a cathode active material. Examples of the binder may include polyvinylidene fluoride, polyvinyl alcohol, carboxymethylcellulose (CMC), starch, hydroxypropylcellulose, recycled cellulose, polyvinylpyrrolidone, tetrafluoroethylene, polyethylene, polypropylene, ethylene-propylene-diene terpolymer (EPDM), sulfonated EPDM, styrene-butylene rubber, fluorine rubber, various polymers, and the like.

The filler is a component for controlling the expansion of a cathode, and is selectively used. The filler is not limited as long as it is a fibrous material while not causing a chemical change in the battery. Examples of the filer may include: olefin polymers such as polyethylene, polypropylene and the like; and fibrous materials such as glass fiber, carbon fiber and the like.

The anode 11 is prepared by applying an anode material onto an anode collector and then drying the anode material. If necessary, the above-mentioned components may be added thereto.

Generally, the anode collector is made to a thickness of 3 to 500 μm. Such an anode collector is not limited as long as it has high conductivity while not causing a chemical change in the battery. For example, the anode collector may be made of copper, stainless steel, aluminum, nickel, titanium, calcined carbon, may be made of copper or stainless steel surface-treated with carbon, nickel, titanium, silver or the like or may be made of an aluminum-cadmium alloy. Further, the surface of the anode collector, the same as the cathode collector may be made uneven to increase the adhesivity of the anode collector to an anode active material. The anode collector may be used in various forms, such as film, sheet, foil, net, porous boy, foam, nonwoven fabric and the like.

Example of the anode material may include: carbon such as hard carbon, graphite carbon or the like; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, group I elements, group II elements, group III elements in the periodic table, halogen; $0 < x \leq 1$; $1 \leq y \leq 3$; $1 \leq z \leq 8$); lithium metal; lithium alloys; silicon alloys; tin alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, GeO$_2$, Bi$_2$O$_3$, Bi$_2$O$_4$, Bi$_2$O$_5$ and the like; conductive polymers such as polyacetylene and the like; and Li—Co—Ni-based materials.

The separation membrane is disposed between the anode and the cathode. An insulating thin film having high ionic permeability and high mechanical strength is used as the separation membrane.

Generally, the separation membrane has a pore diameter of 0.01~10 μm and a thickness of 5~300 μm. As the separation membrane, a sheet or nonwoven fabric made of am olefin polymer such as polypropylene having chemical resistance and hydrophobicity, glass fiber or polyethylene is used. When a solid electrolyte, such as a solid polymer or the like, is used as an electrolyte, the solid electrolyte may serve both as a separation membrane and an electrolyte.

The lithium salt-containing nonaqueous electrolyte includes a nonaqueous electrolyte and lithium. As the nonaqueous electrolyte, a liquid electrolyte, a solid electrolyte, an inorganic solid electrolyte or the like may be used.

As the nonaqueous liquid electrolyte, a nonprotonic organic solvent, such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfuran, 2-methyl tetrahydrofuran, dimthylsulfoxide, 1,3-dioxolan, formamide, dimethylformamide, dioxolan, acetonitrile, nitromethane, methyl formate, methyl acetate, trimester phosphate, trimethoxy methane, a dioxolan derivative, sulfolane, methyl sulfolane, 1,3-dimethyl-2-imidazolidinone, a propylene carbonate derivative, a tetrahydrofuran derivative, ether, methyl propionate, ethyl propionate or the like, may be used.

As the organic solid electrolyte, a polyethylene derivative, a polyethylene oxide derivative, a polypropylene oxide derivative, a phosphoric ester polymer, poly agitation lysine, polyester sulfide, polyvinyl alcohol, polyvinylidene fluoride, a polymer having an ionic dissociation group or the like may be used.

As the inorganic solid electrolyte, nitride, halogenide or sulfate of lithium (Li), such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$ or the like, may be used.

The lithium salt is a material which is easily dissolved in the nonaqueous electrolyte. Examples of the lithium salt may include LiCl, LiBr, LiI, LiClO$_4$, LiBF$_4$, LiF$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroboran lithium, lower aliphatic lithium carboxylate, lithium phenylborate, imide and the like.

Further, in order to improve the charge-discharge characteristics, flame retardancy and the like of the battery, pyridine, triethylphosphite, triethanolamine, cyclic ether, ethylenediamine, n-glyme, hexatriamide phosphate, nitrobenzene derivative, sulfur, quinine-imine dye, N-oxazolidinone, N,N-imidazolidine, ethyleneglycol dialkyl ether, ammonium salt, pyrrole, 2-methoxy ethanol, aluminum trichloride or the like may be added to the nonaqueous electrolyte. According to circumstances, the nonaqueous electrolyte may further include a solvent containing halogen such as carbon tetrachloride, ethylene trifluoride or the like in order to provide flame resistance, and may further include carbon dioxide gas in order to improve high-temperature storage characteristics.

MODE FOR INVENTION

Hereinafter, the present invention will be described in more detail with reference to the following Examples. However, these Examples are set forth to illustrate the present invention, and it will obvious to those skilled in the art that the scope of the present invention is not limited thereto.

EXAMPLES

Preparation Example 1

Synthesis of Center Block Material

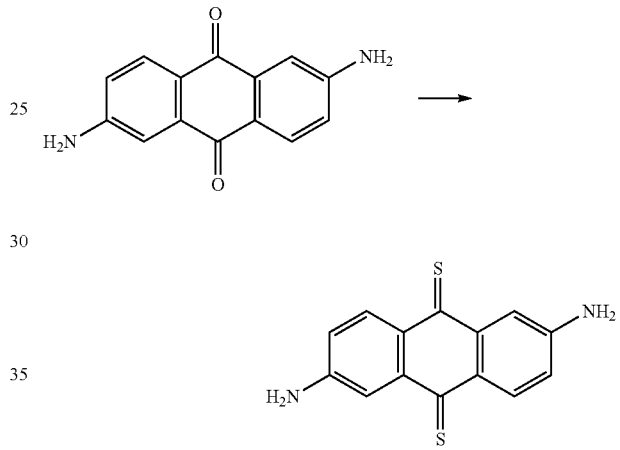

[Reaction Formula 1]

In order to substitute oxygen (O) of diaminoanthraquinone (DAQ) with sulfur (S), DAQ and Lawesson's reagent were put into a flask, and then a reaction was conducted at 110° C. for 24 hours to obtain a first reaction product. Subsequently, an aromatic mixed solvent, a catalyst and the first reaction product were put into a three-neck flask, and then a reaction started at 100° C. At an early stage of the reaction, the reaction mixture was red and opaque, but became dark with the passage of time. After several hours had passed since the reaction, the reaction mixture changed into a clear brown reaction product solution. After the reaction had finished, the reaction product solution became very dark and was partially precipitated as soon as the temperature decreased to room temperature. After the reaction was finished, the reaction product solution stabilised at room temperature was shifted to another flask, and was then separated and purified. Subsequently, the purified reaction product solution was repetitively recrystallized to obtain a precipitate. This precipitate was centrifugally separated and then dried in a vacuum to finally obtain a center block material. The finally-obtained center block material was a very dark brown solid material.

Figure 5:
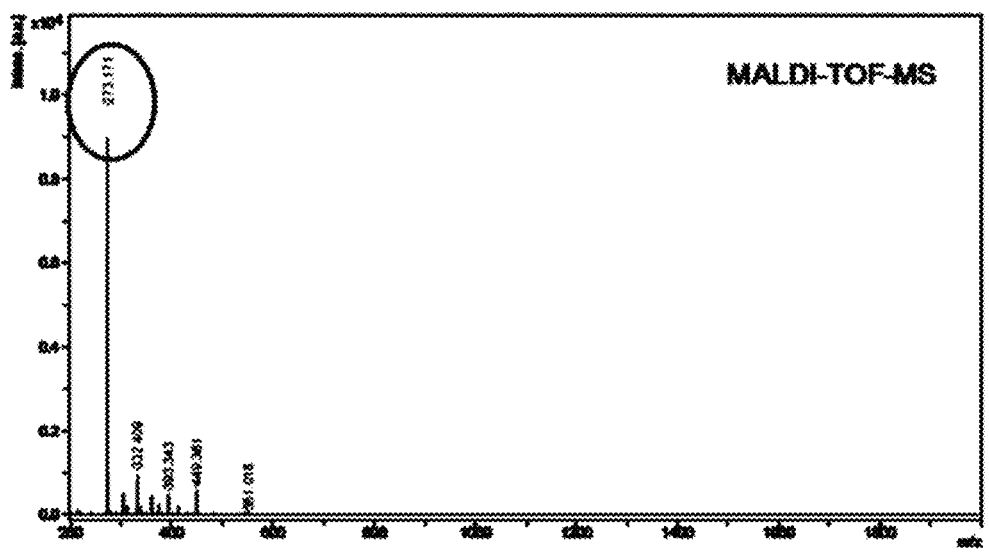
FIG. 5 is a graph showing the result of MALDI-TOF-MS analysis of a center block material synthesized in the present invention.
Figure 6:
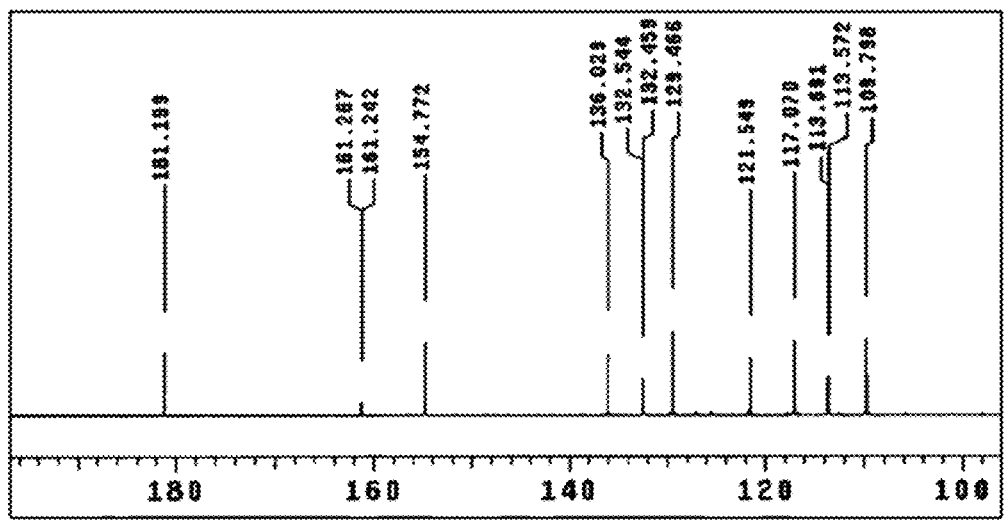
FIG. 6 is a graph showing the result of $^{13}$C-NMR analysis of a center block material synthesized in the present invention.

The synthesized center block material was basically analyzed using MALDI-TOF-MS and $^{13}$C-NMR, and the results thereof are shown in FIGS. 5 and 6.

Preparation Example 2

Synthesis of TDAQ

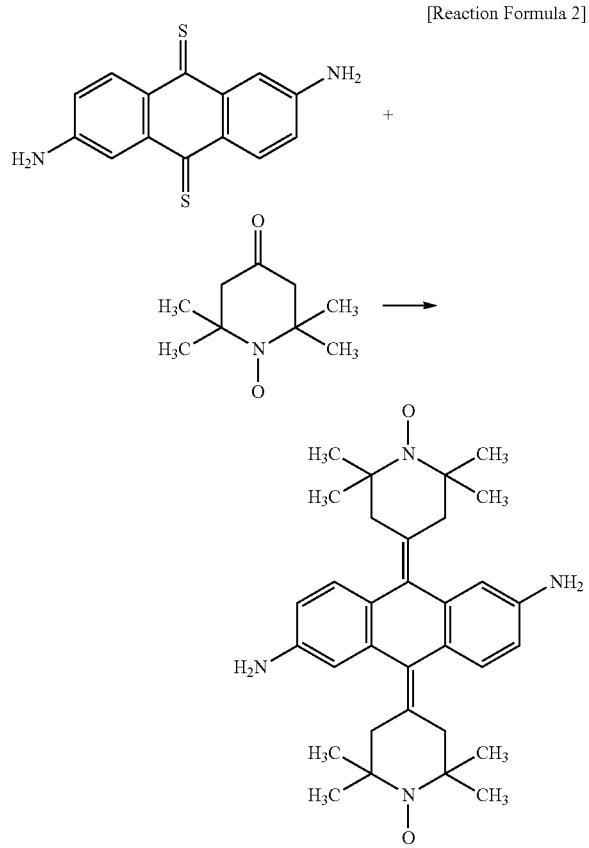

[Reaction Formula 2]

The obtained S-substituted DAQ was reacted with 4-Oxo-TEMPO and a catalyst (P(OEt)$_3$) at 110° C. for 24 hours to obtain TDAQ. First, center block and side block were dissolved in DMSO to prepare a solution, a catalyst was added to the solution, and then the solution was stirred to be uniformly dispersed. The uniformly-dispersed solution was heated to 120° C. and then reacted for about 24 hours. At the end of the reaction, the color of the solution had become dark compared to the color thereof at an early stage of the reaction. Therefore, it was ascertained that the center block had bonded with a side block.

The reaction product solution including the bonded center block and side block was separated and purified using column chromatography. The purified reaction product solution was slowly heated, and simultaneously evaporated using a rotary evaporator to remove a solvent therefrom, thus obtaining a solid reaction product. Subsequently, the solid reaction product was recrystallized by repetitively using a solvent and a non-solvent to remove unreacted materials therefrom. Finally, the recrystallized solid reaction product was centrifugally separated to obtain a primarily-purified solid reaction product.

Figure 7:
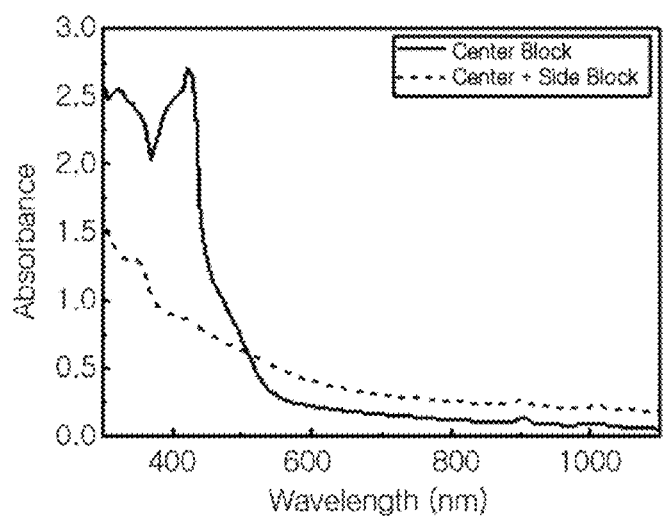
FIG. 7 is a graph comparing the absorbance spectrum of a separated and refined TDAQ product synthesized in the present invention with the absorbance spectrum of only a center block material.

The obtained primarily-purified solid reaction product was analyzed by a general analysis method, and thus it was ascertained that TDAQ was synthesized. FIG. 7 is a graph comparing the absorbance spectrum of the separated and refined TDAQ product with the absorbance spectrum of only center block. In FIG. 7, it can be seen from the structure of TDAQ that band edge was shifted toward long wavelength by about 100 nm.

In order to confirm the existence of the synthesized TDAQ product, an electron spin resonance (ESR) spectrum was measured. First, the ESR spectrum of side block was measured, and ESR signals were accurately measured at a magnetic field of 320~330 ml. Therefore, it can be confirmed that radicals exist in the TEMPO derivative of the side block. Further, as the result of measuring the ESR spectrum of TDAQ, ESR signals were measured at a magnetic field of 320~330 mT, and thus it can be ascertained that the ESR spectrum of TDAQ is very similar to the ESR spectrum of the side block.

Figure 8:
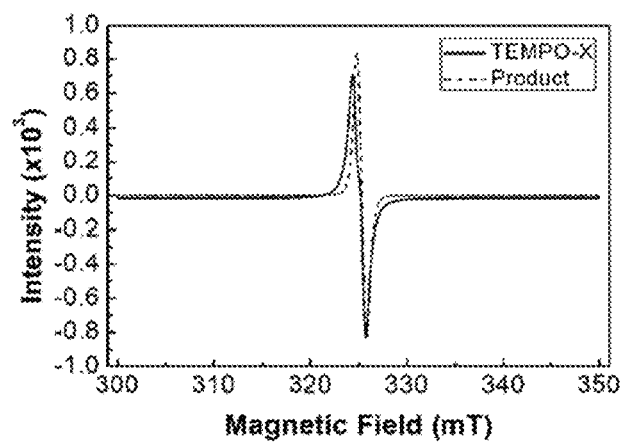
FIG. 8 is a graph comparing the ESR spectrum of only a side block material synthesized in the present invention with the ESR spectrum of TDAQ.

However, it was predicted that the difference between the side block and TDAQ would exist because they are different from each other in molecular structure and environment, so the two ESR spectrums were compared with each other. As shown in FIG. 8, it can be seen that two ESR peaks are very similar to each other at a magnetic field of 320~330 mT, but left signal peaks thereof are different from each other. That is, it can be seen that the left peak of TDAQ leans toward a higher magnetic field. Therefore, it can be ascertained that the center block is bonded with two side blocks to have a symmetric structure, and thus the signal of TEMPO radical moves in a direction toward a high magnetic field.

Preparation Example 3

Synthesis of PMDA-TDAQ Polyamic Acid

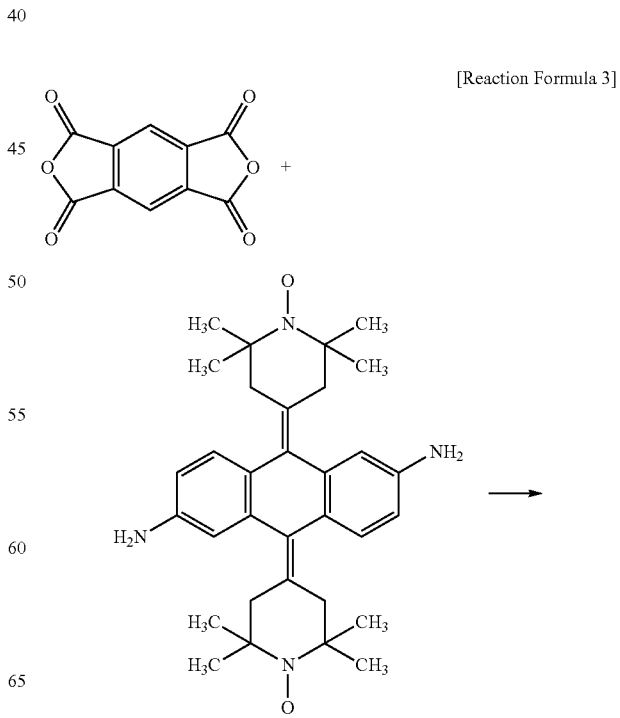

[Reaction Formula 3]

-continued

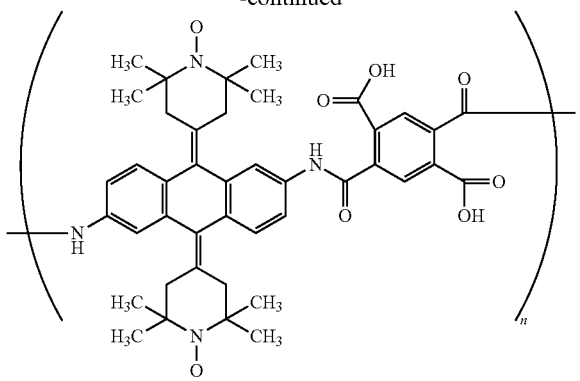

PMDA-TDAQ PAA, which is a solvent-soluble polyamic acid, was synthesized by reacting TDAQ and PMDA at low temperature (0° C.) for 72 hours without using a catalyst. After the reaction was finished, a solution was precipitated by non-solvent to obtain solid matter, and then the solid matter was dried. Specifically, first, TDAQ was put into a three-neck flask, and was then completely dissolved in a mixed solvent to prepare a mixed solution. Subsequently, a soluble comonomer and a catalyst were added to the mixed solution, and then the mixed solution was stirred until it became uniform. Then, the uniformly stirred mixed solution was reacted for about 72 hours while the temperature was controlled. The color of the mixed solution at an early stage of the reaction was clear light brown, but gradually changed to dark brown with the passage of time, and this color was maintained until the reaction was finished. After the reaction had finished, the mixed solution was precipitated by non-solvent and redissolved in a solvent to separate a catalyst and unreacted substances therefrom. Subsequently, in order to separate a larger amount of low-molecular-weight oligomers, the mixed solution was additionally separated by centrifugal separation or the like to obtain a viscous liquid polymer. This viscous liquid polymer was solidified to obtain a solid polymer.

In order to indirectly evaluate whether PMDA-TDAQ PAA was properly formed into a polymer, a film forming test was conducted. The formation of a film was observed by drop-casting the obtained PMDA-TDAQ PAA solution onto a slide glass and then soft-baking the drop-cast PMDA-TDAQ PAA solution. In this case, it was ascertained that the light-colored PMDA-TDAQ PAA solution was formed into a film after soft-baking. Therefore, it was ascertained that the synthesized PMDA-TDAQ PAA is a polymer having a high molecular weight sufficient for forming a film.

Preparation Example 4

Synthesis of BTDA-TDAQ Polyamic Acid

[Reaction Formula 4]

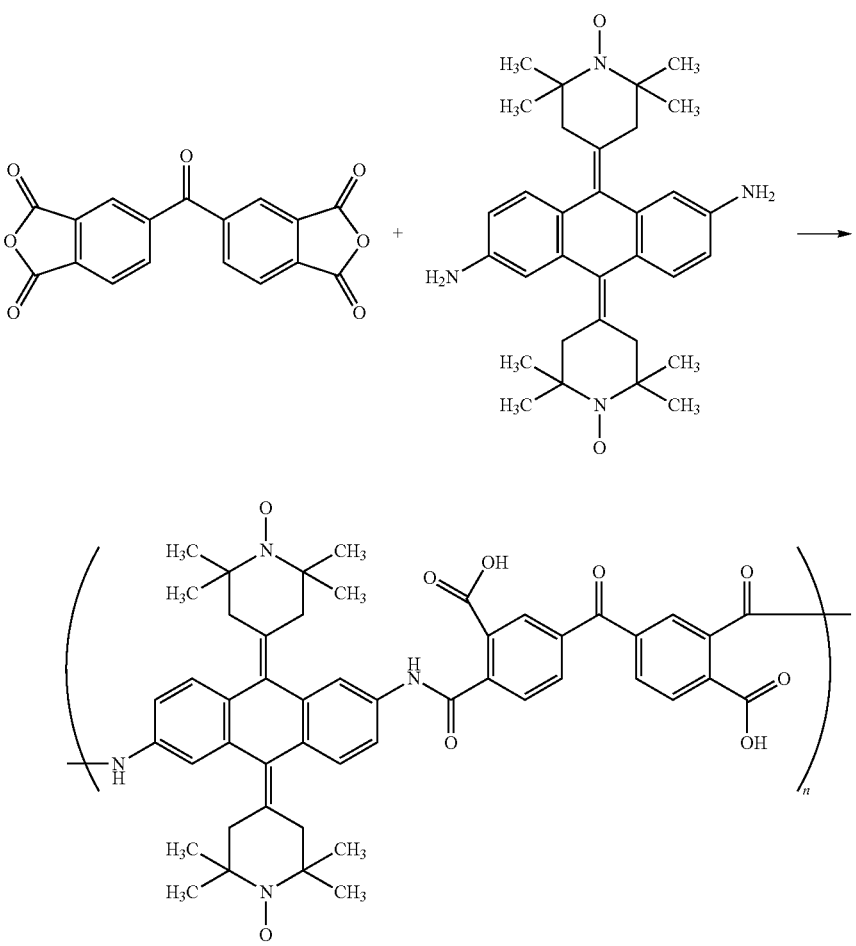

BTDA-TDAQ PAA, which is a solvent-soluble polyamic acid, was synthesized by reacting TDAQ and BTDA at low temperature (0° C.) for 72 hours without using a catalyst. After the reaction had finished, a solution was precipitated by non-solvent to obtain solid matter, and then the solid matter was dried. The color of the solution at an early stage of the reaction was already red because of inherent characteristics of BTDA. After the reaction had finished, a polymer was precipitated (recrystallized) by using a solvent/non-solvent system to obtain a solid polymer.

In order to indirectly evaluate the molecular weight of the separated BTDA-TDAQ PAA, a film forming test was conducted using a drop casting method. As a result, it can be ascertained that a film, not particles, is formed after softbaking a polymer solution. However, it can be ascertained that the film partially includes particles. Therefore, the polymer solution was repetitively separated and purified to remove particles therefrom, and was then formed into a film. As the result of observing the process of forming this film, it can be seen that a clean film can be obtained by only a dilute solution.

Preparation Example 5

Synthesis of BTDA-TDAQ Polyimide

BTDA-TDAQ PI was synthesized by reacting TDAQ and BTDA with triethylamine (TEA) as a catalyst at 160 for 72 hours. At an early stage of the reaction, the reaction product solution was transparent and red, but the color thereof was somewhat changed with the passage of time. After the reaction had finished, the reaction product solution became dark red when the temperature decreased to room temperature.

After the reaction was finished, the reaction product solution was recrystallized by properly using a solvent/non-solvent system and centrifugally-separated to selectively obtain a high-molecular-weight polymer. The obtained high-molecular-weight polymer was dried in a vacuum to obtain a solid polymer. As the result of conducting a basic film forming test, it can be ascertained that a film is formed.

[Reaction Formula 5]

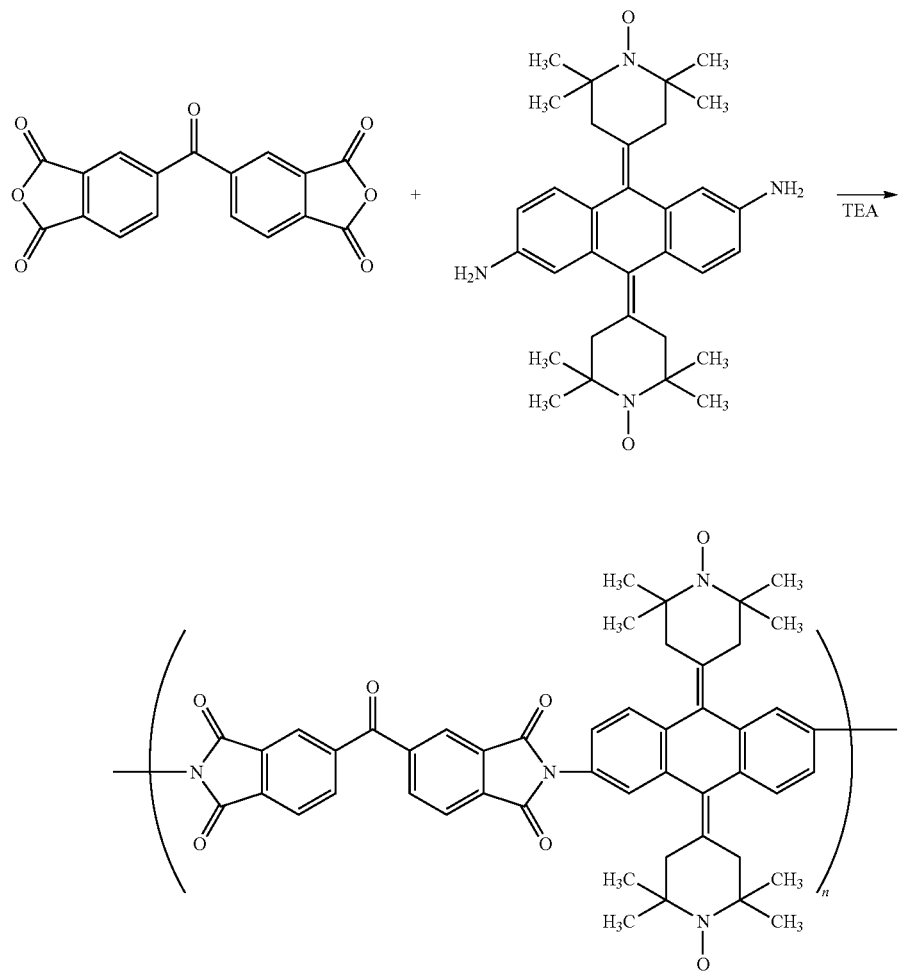

Preparation Example 6

Synthesis of PMDA-TDAQ Polyimide

[Reaction Formula 6]

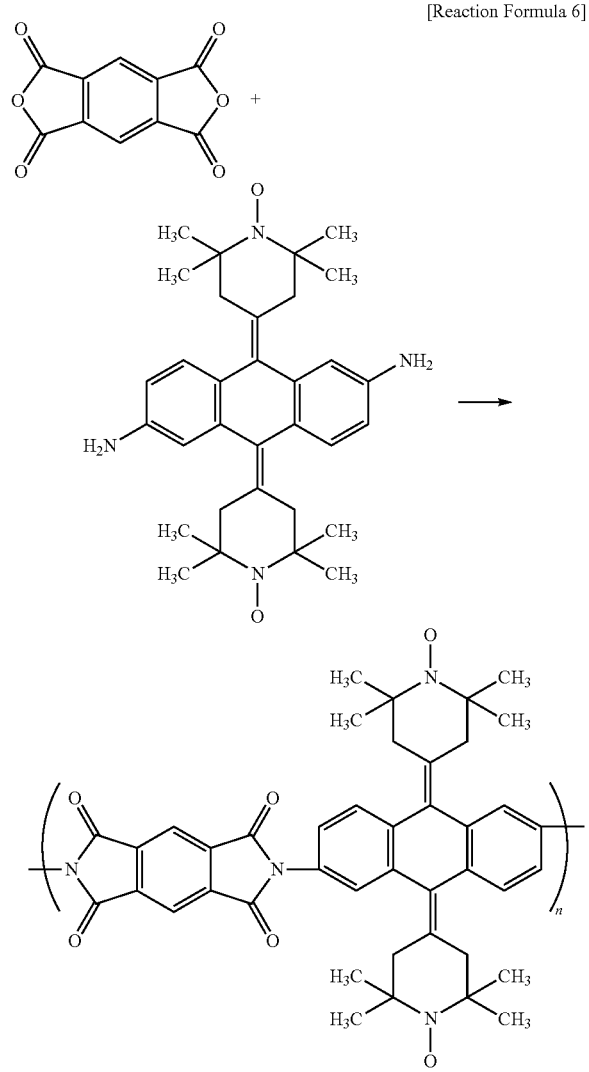

PMDA-TDAQ PI was synthesized in the same manner as in Preparation Example 5, except that TDAQ and PMDA were reacted with triethylamine (TEA) as at catalyst at 160° C. for 72 hours.

Preparation Example 7

Synthesis of BCDA-TDAQ Polyamic Acid

[Reaction Formula 7]

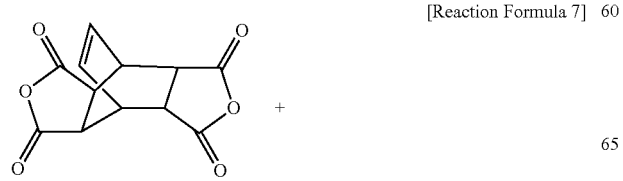

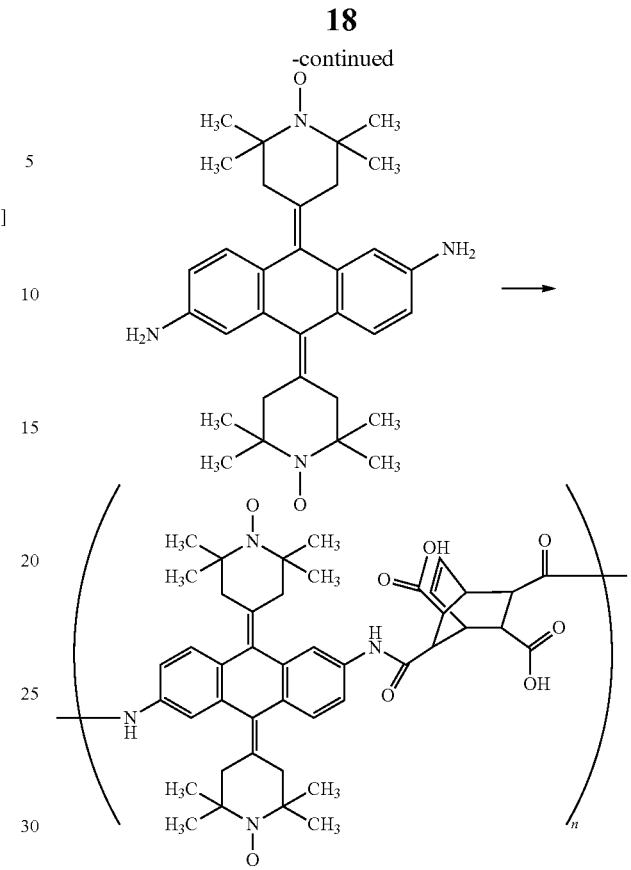

BCDA-TDAQ PAA, which is a solvent-soluble polyamic acid, was synthesized in the same manner as in Preparation Example 4, except that TDAQ and BCDA were reacted at low temperature (0° C.) for 72 hours without using a catalyst. After the reaction had finished, a solution was precipitated by non-solvent to obtain solid matter, and then the solid matter was dried.

Preparation Example 8

Synthesis of BCDA-TDAQ Polyimide

[Reaction Formula 8]

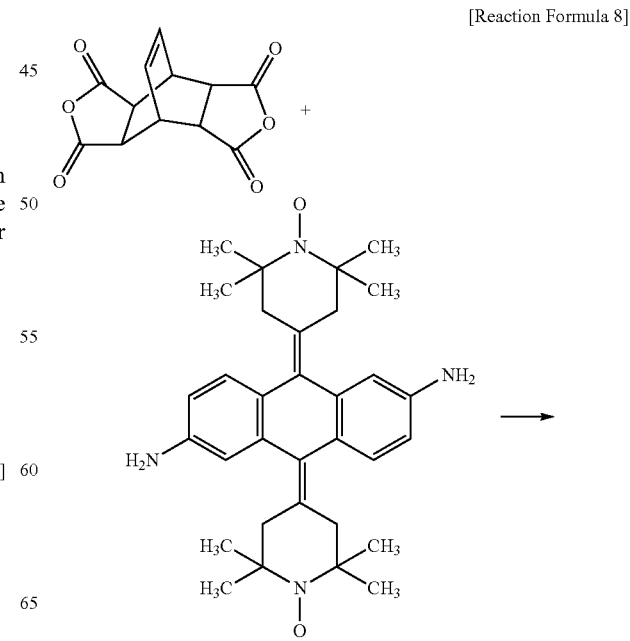

-continued

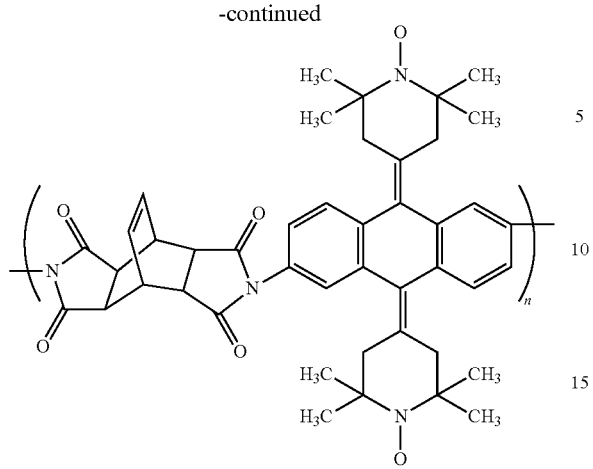

BCDA-TDAQ PI was synthesized in the same manner as in Preparation Example 5, except that TDAQ and BCDA were reacted with triethylamine (TEA) as a catalyst at 160° C. for 72 hours.

Preparation Example 9

Synthesis of NTCDA-TDAQ Polyamic Acid

[Reaction Formula 9]

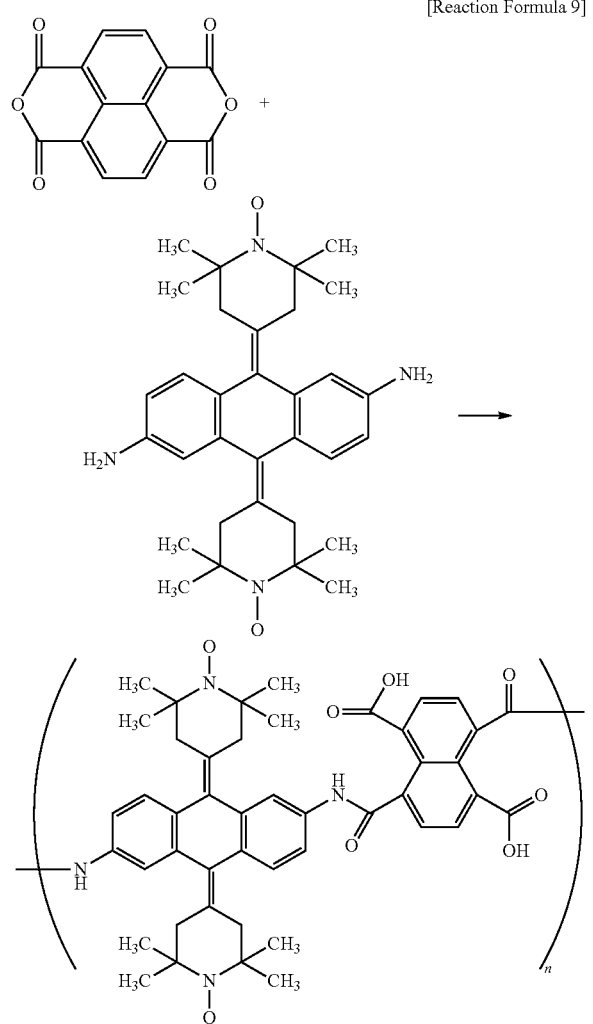

NTCDA-TDAQ PAA, which is a solvent-soluble polyamic acid, was synthesized in the same manner as in Preparation Example 4, except that TDAQ and NTCDA were reacted at low temperature (0° C.) for 72 hours without using a catalyst. After the reaction had finished, a solution was precipitated by non-solvent to obtain solid matter, and then the solid matter was dried.

Preparation Example 10

Synthesis of NTCDA-TDAQ Polyimide

[Reaction Formula 10]

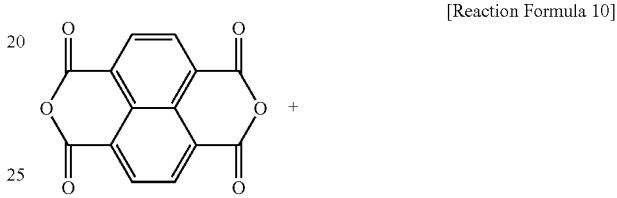

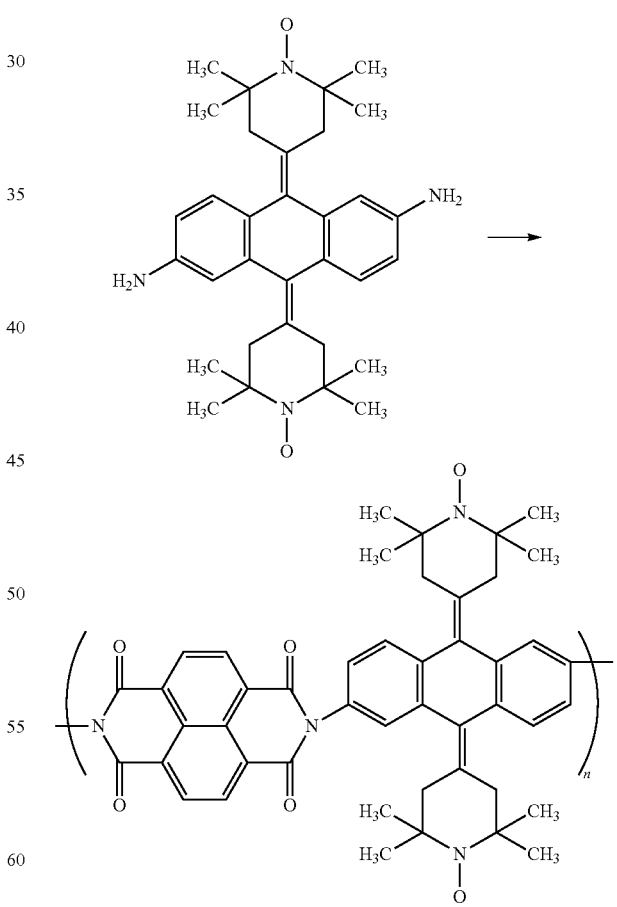

NTCDA-TDAQ PI was synthesized in the same manner as in Preparation Example 5, except that TDAQ and NTCDA were reacted with triethylamine (TEA) as a catalyst, at 160° C. for 72 hours.

Preparation Example 11

Synthesis of PTCDA-TDAQ Polyamic Acid

[Reaction Formula 11]

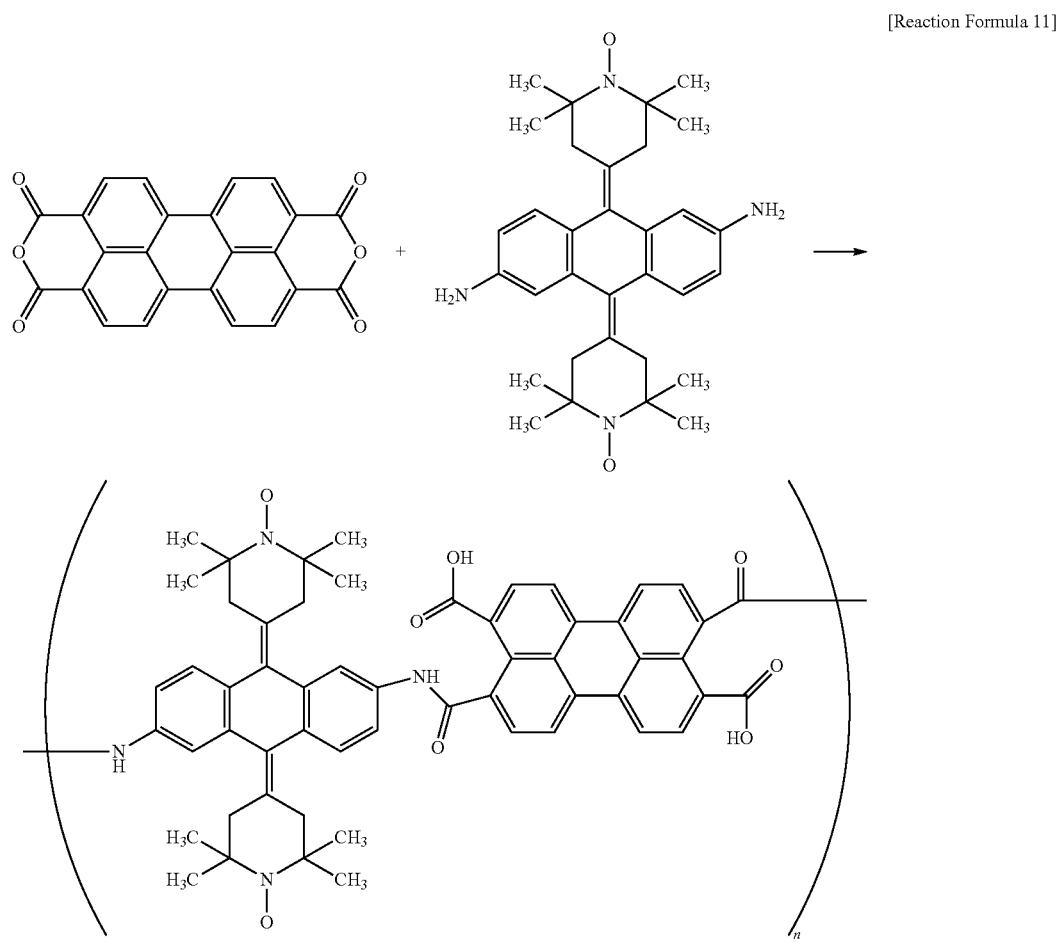

PTCDA-TDAQ PAA, which is a solvent-soluble polyamic acid, was synthesized in the same manner as in Preparation Example 4, except that TDAQ and PTCDA were reacted at low temperature (0° C.) for 72 hours without using a catalyst. After the reaction had finished, a solution was precipitated by non-solvent to obtain solid matter, and then the solid matter was dried.

Preparation Example 12

Synthesis of PTCDA-TDAQ Polyimide

[Reaction Formula 12]

-continued

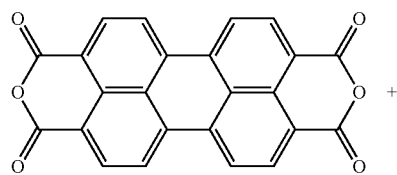

-continued

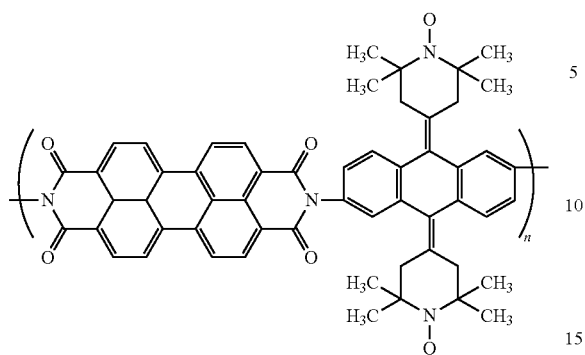

PTCDA-TDAQ PI was synthesized in the same manner as in Preparation Example 5, except that TDAQ and PTCDA were reacted with triethylamine (TEA) as a catalyst at 160° C. for 72 hours.

Preparation Example 13

Synthesis of BPDA-TDAQ Polyamic Acid

BPDA-TDAQ PAA, which is a solvent-soluble polyamic acid, was synthesized in the same manner as in Preparation Example 4, except that TDAQ and BPDA were reacted at low temperature (0° C.) for 72 hours without using a catalyst. After the reaction had finished, a solution was precipitated by non-solvent to obtain solid matter, and then the solid matter was dried.

Preparation Example 14

Synthesis of BPDA-TDAQ Polyimide

[Reaction Formula 14]

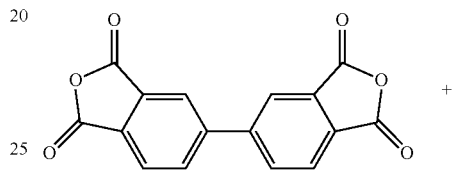

+

[Reaction Formula 13]

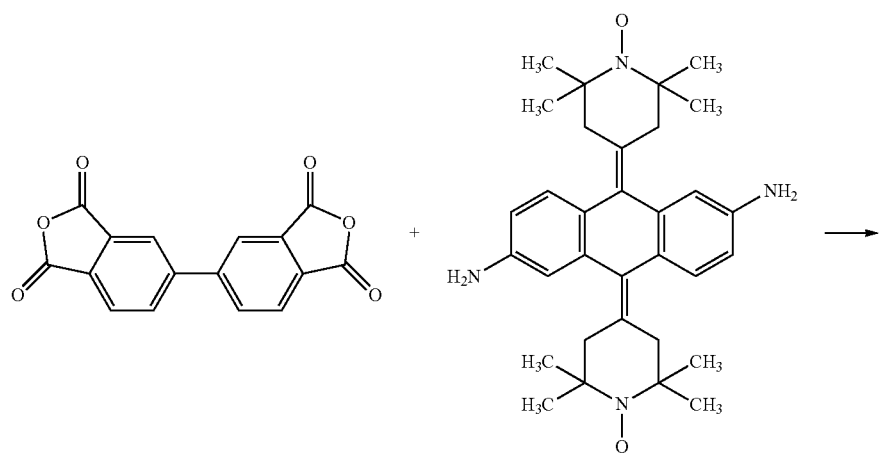

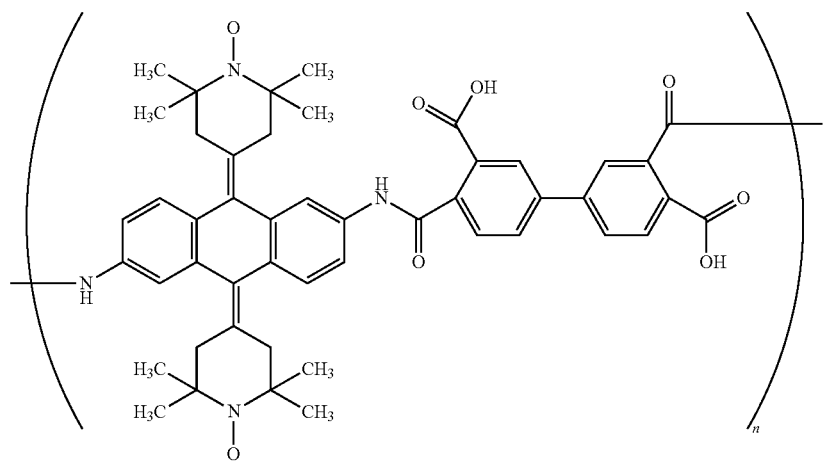

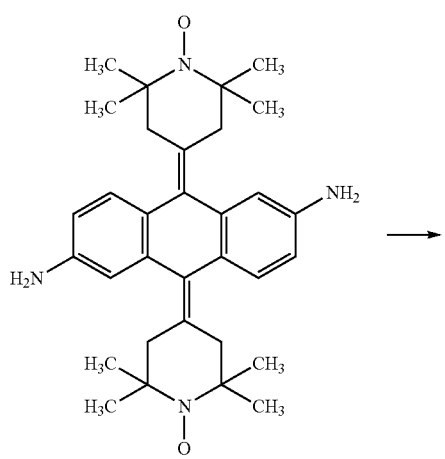
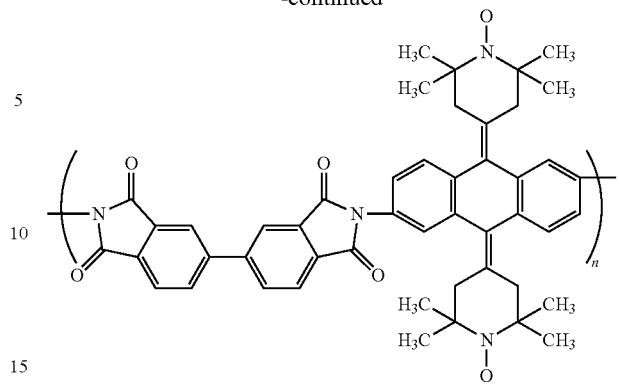
BPDA-TDAQ PI was synthesized in the same manner as in Preparation Example 5, except that TDAQ and BPDA were reacted with triethylamine (TEA) as a catalyst at 160° C. for 72 hours.
Preparation Example 15
Synthesis of 6FDA-TDAQ Polyamic Acid
[Reaction Formula 15]
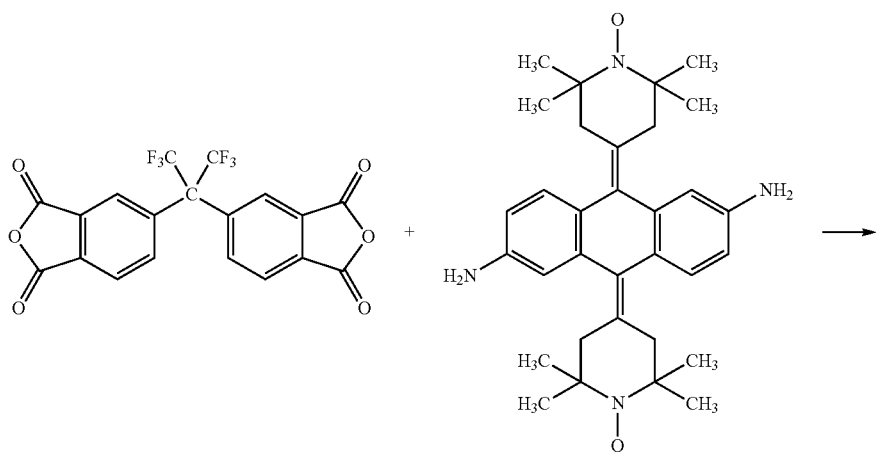
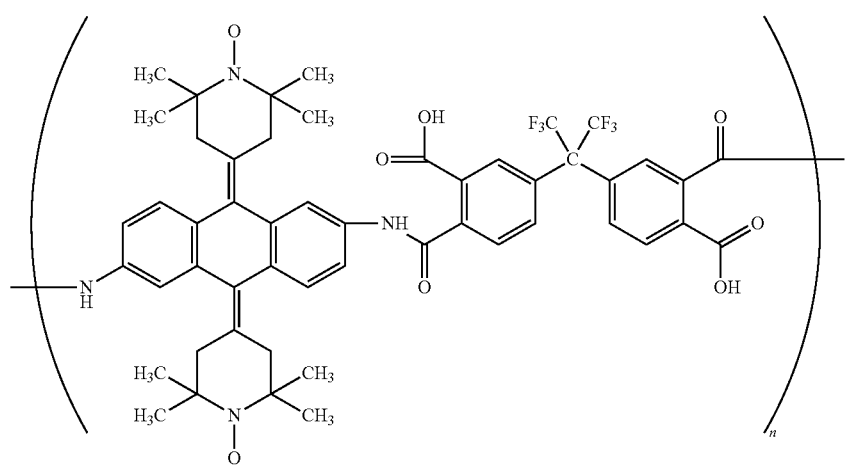

6FDA-TDAQ PAA, which is a solvent-soluble polyamic acid, was synthesized in the same manner as in Preparation Example 4, except that TDAQ and 6FDA were reacted at low temperature (0° C.) for 72 hours without using a catalyst. After the reaction had finished, a solution was precipitated by non-solvent to obtain solid matter, and then the solid matter was dried.

Preparation Example 16

Synthesis of BPDA-TDAQ Polyimide

[Reaction Formula 16]

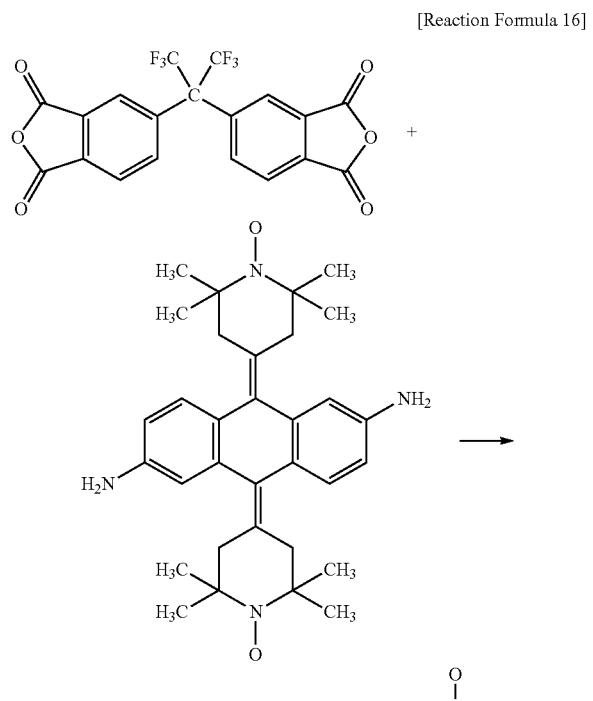

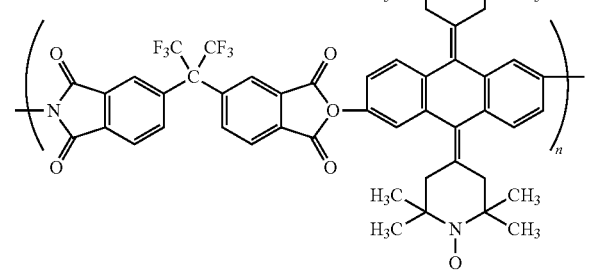

6FDA-TDAQ PI was synthesized in the same manner as in Preparation Example 5, except that TDAQ and 6FDA were reacted with triethylamine (TEA) as a catalyst at 160° C. for 72 hours.

Evaluation Example 1

Evaluation of PMDA-TDAQ PI According to the Present Invention (1) As shown in FIG. 1, from the result of the ESR spectrum of PMDA-TDAQ PI, it can be ascertained that, during a synthesis process, a radical is maintained without being decomposed.

Figure 2:
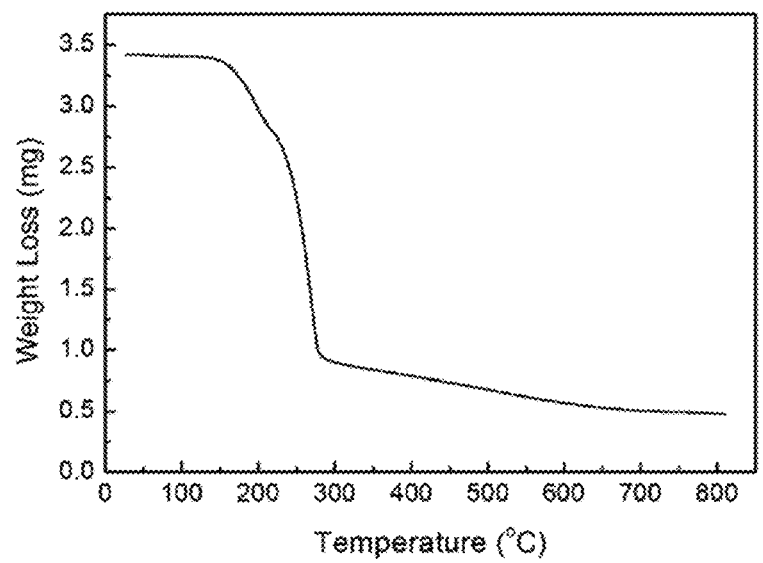
FIG. 2 is a graph showing the result of TGA analysis of PMDA-TDAQ PI according to an embodiment of the present invention.

(2) As shown in FIG. 2, from the result of TGA analysis of PMDA-TDAQ PI, it can be ascertained that the initial decomposition temperature thereof by oxygen is 170° C. or more, and thus a process of manufacturing an electrode can be carried out in the air.

Figure 3:
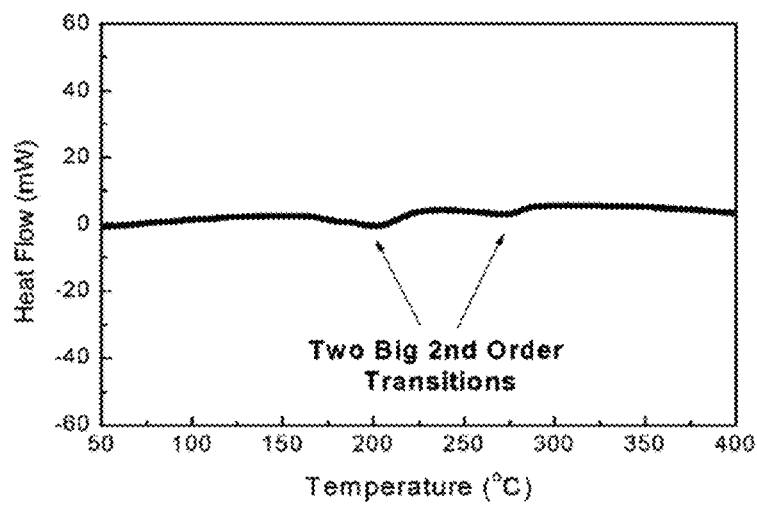
FIG. 3 is a graph showing the result of DSC analysis of PMDA-TDAQ PI according to an embodiment of the present invention.

(3) As shown in FIG. 3, from the result of DSC analysis of PMDA-TDAQ PI, it can be ascertained that two glass transition temperatures were identified.

Figure 4:
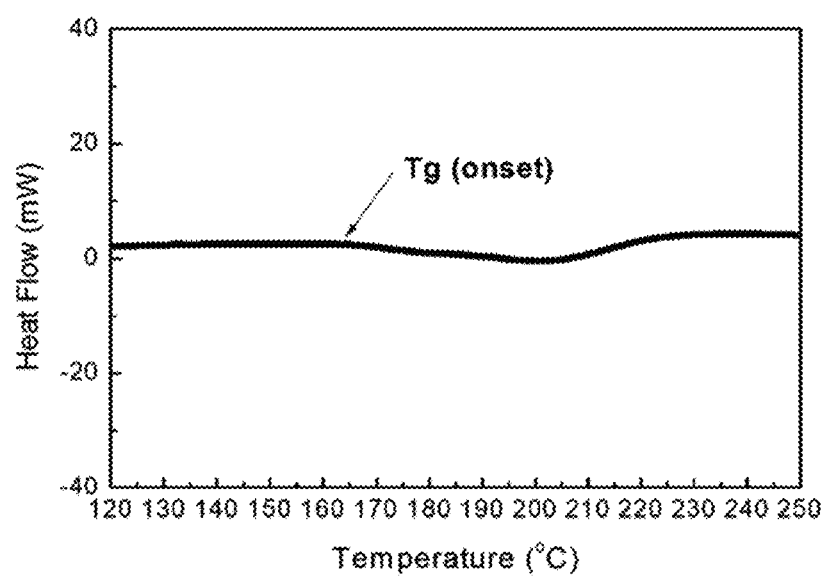
FIG. 4 is a graph showing the result of DSC analysis of PMDA-TDAQ PI according to an embodiment of the present invention.

(4) As shown in FIG. 4, from the result of DSC analysis of PMDA-TDAQ PI, it can be ascertained that the initial glass transition temperature thereof is 160° C. or more.

Evaluation Example 2

Evaluation of Flexibility Characteristics of Organic Radical Polyimide According to the Present Invention (1) The PMDA-TDAQ PAA precursor polymer synthesized according to the present invention was applied onto a glass substrate, and was then thermally-imidized to form a PMDA-TDAQ PI film.

(2) The PMDA-TDAQ PI film formed in this way was detached from the glass substrate, and then the flexibility thereof was evaluated. The results thereof are shown in FIGS. 9A to 9C.

(3) From the results, it can be ascertained that a conventional inorganic electrode for a secondary battery is cracked or destroyed when it is bent at an angle of 90° to 180°, whereas the organic radical polyimide film of the present invention returns to the original state even after it is bent.

Figure 9:
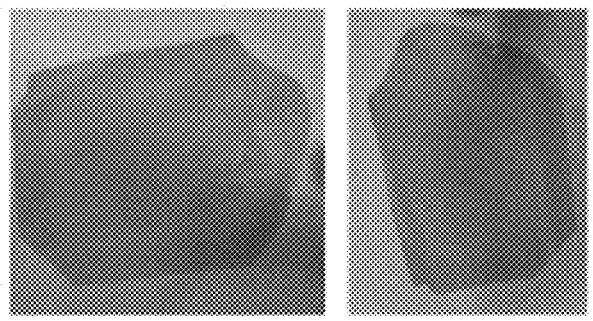
FIGS. 9A to 9C show images evaluating the flexibility characteristics of PMDA-TDAQ PI according to an embodiment of the present invention.
Figure 9:
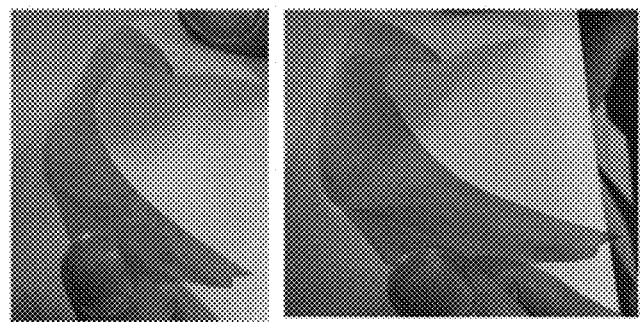
Figure 9:
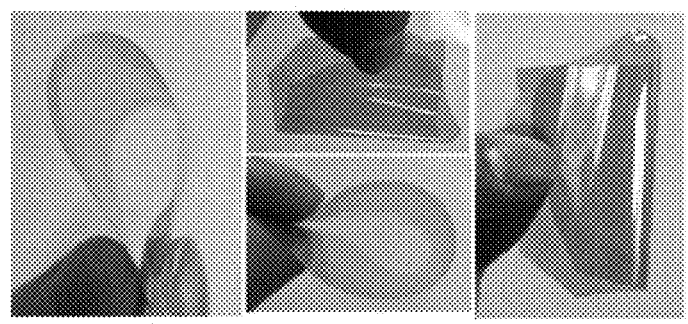

(4) FIG. 9A shows a PI film detached from a substrate, FIG. 9B shows the results of testing the flexibility of the PI film, and FIG. 9C shows the flexibility of the PI film bent at an angle of 180°.

Example 1

Manufacture of a Lithium-Ion Secondary Battery

The synthesized PMDA-TDAQ PAA precursor polymer was applied onto an ITO substrate to a thickness of 10 to 1000 nm, and was then thermally-imidized at a temperature of 150 to 200° C. to form a PMDA-TDAQ PI cathode.

The PMDA-TDAQ PI cathode formed in this way was combined with an anode, and an electrolyte including $LiPF_6$ and propylene carbonate was injected, thus manufacturing an organic radical battery.

The voltage of the manufactured battery was 3~3.3 V, and the capacitance thereof was approximately 9.0 mAh/g.

Example 2

Manufacture of a Lithium-Ion Secondary Battery

The synthesized PMDA-TDAQ PAA precursor polymer was applied onto an ITO substrate to a thickness of 10 to 1000 nm, and was then thermally-imidized at a temperature of 150 to 200° C. to form a PMDA-TDAQ PI cathode.

The PMDA-TDAQ PI cathode formed in this way was coated thereon with a polymer-gel electrolyte obtained by mixing polyethylene oxide (PEO) and PVDF-HFP with $LiPF_6$ and propylene carbonate to a thickness of 500~10000 nm, and was then combined with a metal electrode (lithium or aluminum), thus manufacturing an organic radical battery.

The voltage of the manufactured battery was 2.7~3.4 V, and the capacitance thereof was approximately 60~110 mAh/g.

REFERENCE NUMERALS

11: anode
12: electrolyte
13: organic radical polyimide cathode
14: collector
15: substrate

The invention claimed is:

1. An organic radical polyimide, represented by Formula 1 below:

[Formula 1]

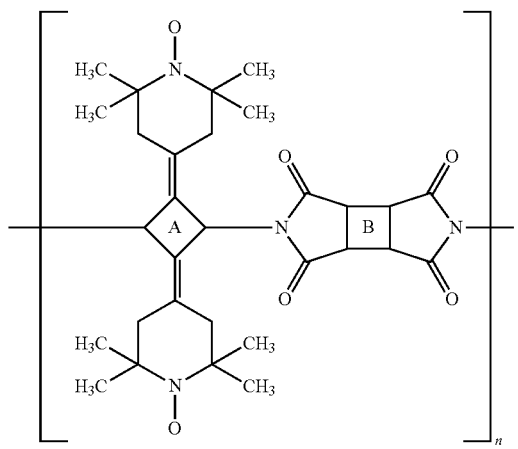

wherein A is a substituted or unsubstituted aryl group of 6 to 24 carbon atoms; and B is selected from the group consisting of a substituted or unsubstituted aryl group of 6 to 24 carbon atoms, a substituted or unsubstituted alkyl group of 1 to 6 carbon atoms and a substituted or unsubstituted alkoxy group of 1 to 6 carbon atoms, and is condensed with an adjacent pyrrolidine ring to form a ring.

2. The organic radical polyimide of claim 1, wherein A and B are each independently further substituted with one or more selected from the group consisting of a hydrogen atom, a heavy hydrogen atom, a cyano group, a halogen atom, a hydroxy group, a nitro group, a substituted or unsubstituted alkyl group of 1 to 6 carbon atoms and a substituted or unsubstituted aryl group of 6 to 24 carbon atoms.

3. The organic radical polyimide of claim 1, wherein the compound represented by Formula 1 above is any one selected from the group consisting of compounds represented by Formulae 3 to 9:

[Formula 3]

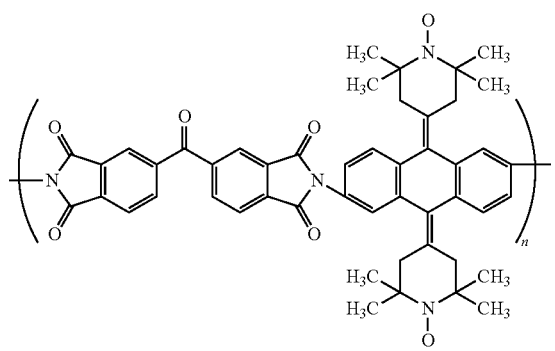

[Formula 4]

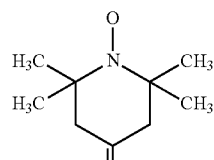
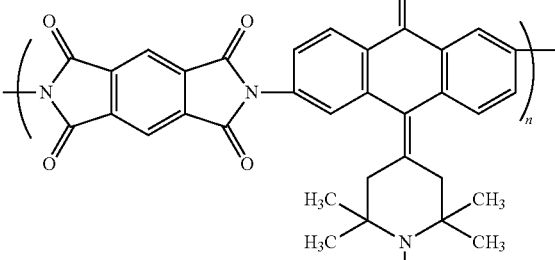

[Formula 5]

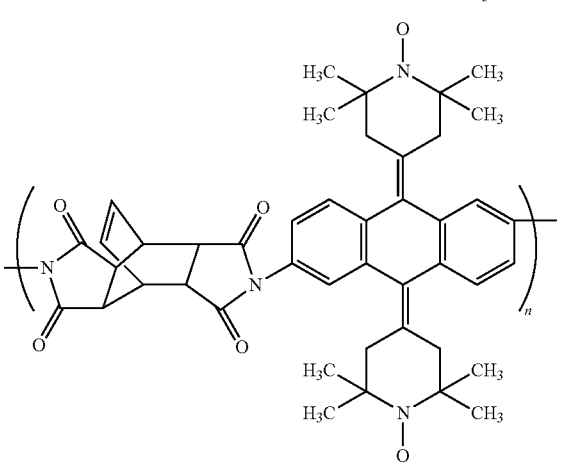

[Formula 6]

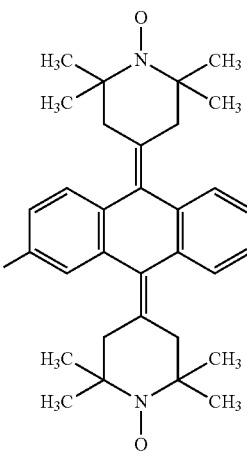

-continued

[Formula 7]

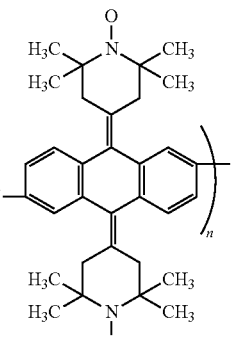

[Formula 8]

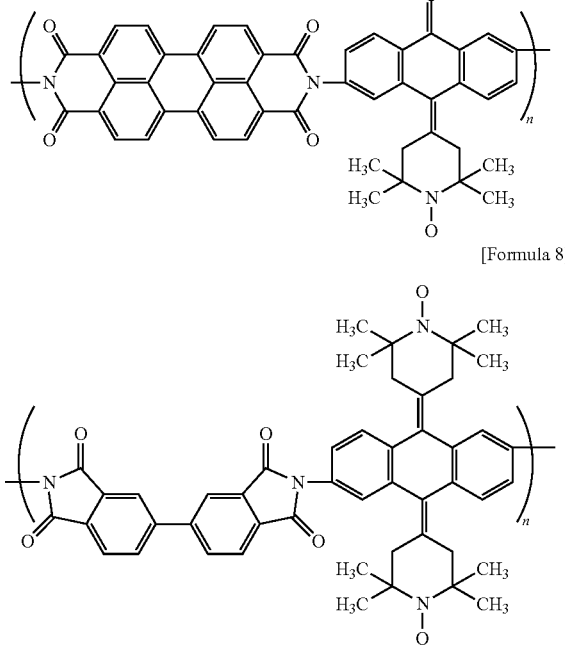

[Formula 9]

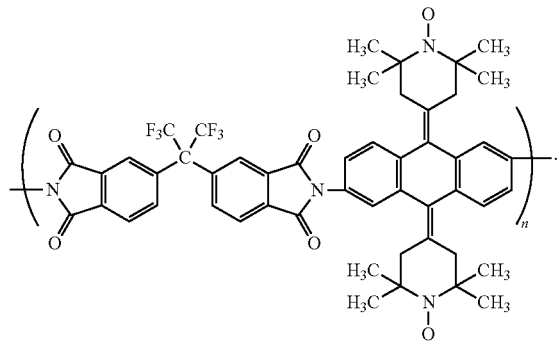

4. An electrode, comprising the organic radical polyimide of claim 1.

5. The electrode of claim 4, wherein the electrode is a cathode.

6. An electrochemical device, comprising: a cathode; an anode; and an electrolyte,
wherein the cathode or anode is an electrode comprising the organic polyimide of claim 1.

7. The electrochemical device of claim 6, wherein the electrochemical device is a lithium secondary battery.

8. An electrode, comprising the organic radical polyimide of claim 2.

9. The electrode of claim 8, wherein the electrode a cathode.

10. An electrode, comprising the organic radical polyimide of claim 3.

11. The electrode of claim 10, wherein the electrode is a cathode.

12. An electrochemical device, comprising: a cathode; an anode; and an electrolyte,
wherein the cathode or anode is an electrode comprising the organic radical polyimide of claim 2.

13. The electrochemical device of claim 12, wherein the electrochemical device is a lithium secondary battery.

14. An electrochemical device, comprising: a cathode; an anode; and an electrolyte,
wherein the cathode or anode is an electrode comprising the organic radical polyimide of claim 3.

15. The electrochemical device of claim 14, wherein the electrochemical device is a lithium secondary battery.

\* \* \* \* \*